Aug. 16, 1932.     E. E. McGREW     1,871,804
POULTRY FEEDER
Filed June 29, 1931     2 Sheets-Sheet 1

Inventor
E. E. McGrew
By Emil F. Lange
Attorney

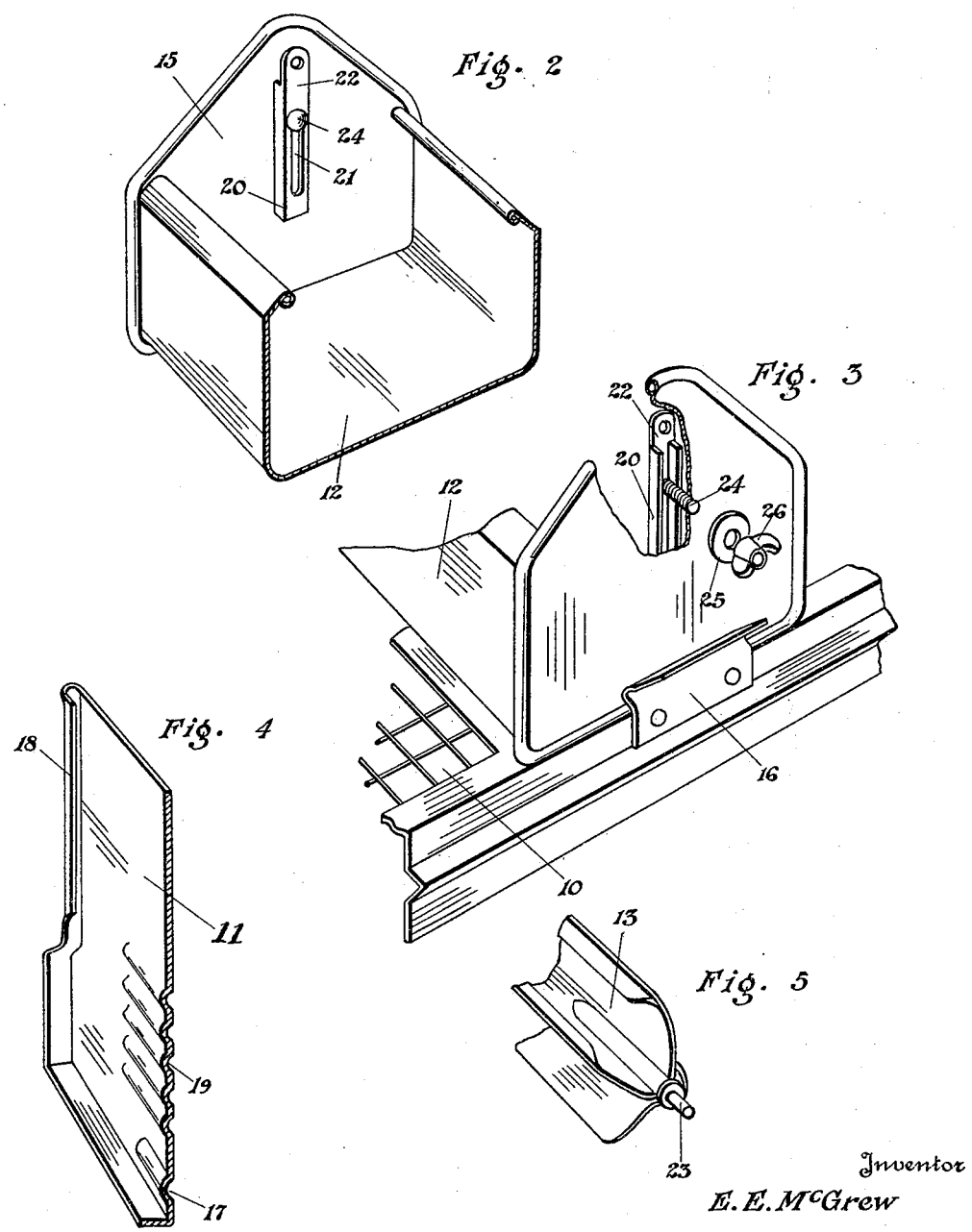

Patented Aug. 16, 1932

1,871,804

UNITED STATES PATENT OFFICE

EARL E. McGREW, OF LINCOLN, NEBRASKA, ASSIGNOR TO McGREW MACHINE COMPANY, OF LINCOLN, NEBRASKA, A CORPORATION OF NEBRASKA

POULTRY FEEDER

Application filed June 29, 1931. Serial No. 547,477.

My invention relates to poultry feeders, its main object being the provision of a feeder which will greatly facilitate the work of the poultrymen during the growing season of the fowls.

One of the objects of the invention is the provision of a feeder and a support therefor, the feeder being adjustable in height on its support so that its height may be adjusted for the smallest chicks through all stages of growth.

Another of my objects is the provision of a poultry feeder with a rotatable guard for preventing the fowls from getting either above or into the feeder.

Another of my objects is the provision of a rotatable guard on a poultry feeder, the guard being adjustable as to height for adjustment in accordance with the growth of the fowls.

Another of the objects is the provision of a sanitary base for a poultry feeder, the base being designed both for receiving the droppings from the fowls and for preventing the fowls from scratching litter and soil into the feeder.

Another of the objects is the provision of a knock-down feeder for convenience in storing and shipping, the knock-down features being also important in connection with the adjustability of the feeder on the support.

Having in view these objects and others which will be pointed out in the following description, I will now refer to the drawings, in which Figure 1 is a view in perspective of the poultry feeder.

Figure 2 is a perspective view of a fragment of the feed receptacle looking toward the far end from the inside.

Figure 3 is a perspective view of a fragment of the feed receptacle with its base as it appears when looking toward one of the ends thereof from the outside.

Figure 4 is a perspective view of a sectioned portion of one of the two supports.

Figure 5 is a view in perspective of an end fragment of the reel.

Figure 1:
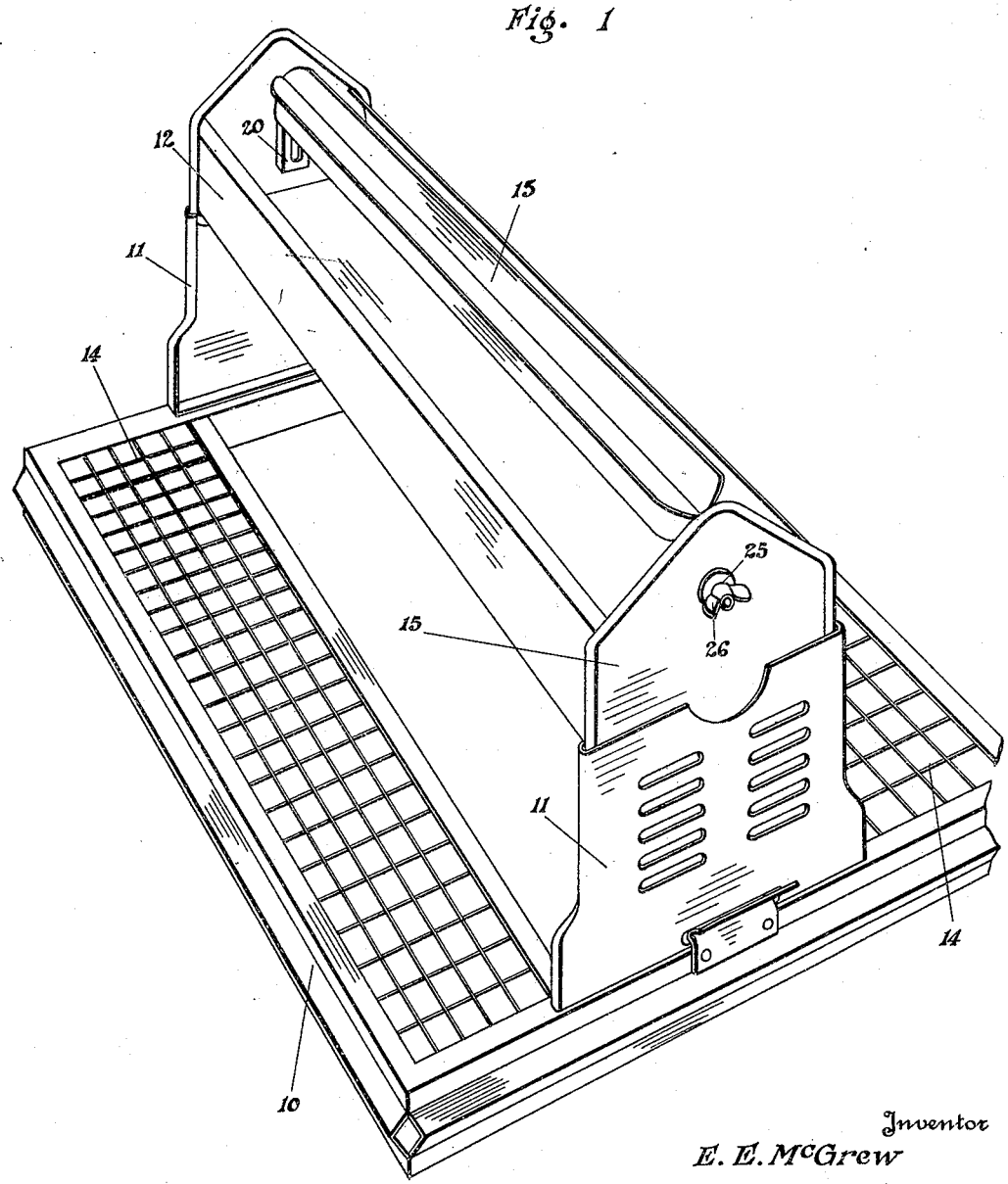

The entire poultry feeder includes a base 10, end supports 11, a feed receptacle 12, and a reel 13. The base includes a rectangular frame preferably formed from sheet metal having a narrow upper margin and a depending side margin which is crimped into V shape in its middle portion. The frame is thus of sturdy construction which will withstand the rough usage to which such a feeder is subjected. The base further includes two reticulated floors 14 which permit the droppings to fall through. These floors 14 are spaced above the surface on which the feeder rests, a distance equal to the thickness of the base and it thus becomes impossible for the fowls to scratch litter and soil into the feed receptacle. The base is further open in its middle portion at 15 underneath the feed receptacle 12 as shown in Figure 1.

The feed receptacle is supported by the base either directly as shown in Figure 3 or through the supports 11 as shown in Figure 1. The feed receptacle is formed out of sheet metal in which the side walls and bottom are integral. The upper edges of the side walls are turned inwardly as shown in Figure 2 and the end portions are rolled into rounded form so that no rough edges will be present to interfere with the fowls to their possible injury. The end walls 15 of the feed receptacle are also rolled into rounded form as best shown in Figure 3. The roll of the walls is on the outer side, thus forming a bead over the entire edge of the end wall. The base 10 has two clips 16 secured thereto at opposite ends. These clips are resilient and they are designed to engage the end walls at their beads, this manner of securing the feed receptacle to the base being best shown in Figure 3. With the smallest size fowls the feed receptacle is secured directly to the base as shown in Figure 3.

During the growth of the fowls it is desirable that the feed receptacle be adjustably elevated. For this purpose I have provided a pair of supports 11 which have means for engaging both the base 10 and the feed receptacle 12. They also are formed from sheet metal and each has a socket 17 adapted for seating the rib of a clip 16. The side edges of the supports are rolled at 18 for slidably receiving the beads at the sides of the end walls 15. It is apparent that when the supports engage the feed receptacle, the supports may be firmly secured to the base by means of the clips 16. The feed receptacle is slidable in an up and down direction in the supports 11 but it is desirable also that they be releasably latched in any adjusted position. For this purpose the supports are each provided with corrugations 19. The inner surfaces of these corrugations 19 engage the bead at the lower edge of the end wall of the feed receptacle. The material from which the entire structure is made is sufficiently resilient to permit the sliding of the feed receptacle in the supports 11 against the resistance offered by the corrugations 19 but these corrugations will latch the feed receptacle against any and all accidental displacements. As the fowls grow in size, it is only necessary that the poultrymen lift the feed receptacle over one notch on each side, in which position the parts may remain until the further growth of the fowls makes further adjustment desirable.

The reel 13 is rotatably mounted in the upper part of the feed receptacle 12. If fowls attempt to stand on it the reel will turn on its axis to throw the fowl off. If the fowls attempt to stand on the side edges of the feed receptacle, they will also be thrown off by the reel which is rotated by other fowls attempting to get onto the reel. In this way the receptacle is kept entirely free from the droppings of the birds attempting to stand either on the reel itself or on the side edges of the feed receptacle. The reel, however, has an additional function in limiting the size of the opening through which the fowls may stick their heads in order to get at the contents. With very small chicks this opening is at its smallest size but it is necessary that the opening be increased in size with the growth of the chickens. The reel has therefore been made adjustable by means of the structures shown particularly in Figures 1, 2 and 3. At each end of the reel is a channel member 20 which is provided with a slot 21 and with an ear 22. The ears 22 are apertured to serve as bearings for the spindle 23 of the reel. Passing through each end wall of the feed receptacle is a bolt 24 having its head on the inner side. This bolt carries a washer 25 and a wing nut 26 on its outer end portion. When the nuts 26 are loose the channel members 20 may be moved up or down and they may be latched in any desired position by merely tightening the nuts 26. Up and down movement of the channel members 20 causes the reel 13 to be moved up or down to thus increase or decrease the size of the opening through which the fowls must obtain their food from the feed receptacle.

The supports 11 are dispensed with at certain stages of growth of the animals. Likewise, the base 10 may be omitted at all stages unless it is desired to gain the advantage of the sanitary features of the base. The feed receptacle 12 may be placed on the floor or in the yard and the supports 11 may then be employed for adjustably elevating the feed receptacle, the base 10 being not essential for the operation of the feeder.

While I have described the feeder as a poultry feeder, it is obvious that the adjustable features would adapt the feeder for use with other growing animals such as hogs. For this purpose it is only necessary to modify the structure by building it in suitable dimensions and out of material which is heavy enough for the purpose. I therefore wish it to be understood that I reserve to myself all rights to the invention as an animal feeder rather than as a specific poultry feeder.

Having thus described my invention in such full, clear, and exact terms that its construction and operation will be readily understood by others skilled in the art to which it pertains, what I claim as new and desire to secure by Letters Patent of the United States is:

1. A poultry feeder including a feed receptacle having an outwardly projecting bead on each of the opposite ends thereof, supporting legs having means for slidably receiving the ends of said receptacle, and inwardly projecting horizontal ribs on said supporting legs for releasably engaging said beads on the ends of said receptacle.

2. A poultry feeder including a feed receptacle having an outwardly projecting bead at each side edge and the bottom edge of each of two opposite ends of said receptacle, supporting legs having channeled side edges for slidably receiving the side beads at the ends of said receptacle, and inwardly projecting horizontal ribs on said supporting legs for releasably engaging the bottom beads on the ends of said receptacle.

3. A poultry feeder including a feed receptacle, and a sanitary base therefor, said base having a reticulated floor for supporting the fowls while feeding to prevent scratching and to receive the droppings, and a releasable connection between said receptacle and said base, said connection including resilient clips secured to said base for engaging a pair of opposite walls of said receptacle.

4. A poultry feeder including an elevated feed receptacle with an open space therebeneath, legs at opposite ends of said receptacle to give access to the open space beneath said receptacle, means on said receptacle for slidable engagement with said legs whereby said receptacle may be adjustably positioned at different levels above the supporting surface, and means for latching said receptacle in any of its adjusted positions.

5. A poultry feeder including a feed receptacle having an outwardly projecting bead on the edges of each of two opposite ends thereof, supporting legs having means for slidably receiving the beaded ends of said receptacle for adjustably supporting said receptacle at various levels above the supporting surface, and means for releasably latching said receptacle in any of its desired positions.

In testimony whereof I affix my signature.

EARL E. McGREW.